United States Patent
Nakakuki

(10) Patent No.: US 6,373,532 B1
(45) Date of Patent: Apr. 16, 2002

(54) METHOD AND APPARATUS FOR PROCESSING IMAGE DATA

(75) Inventor: Toshio Nakakuki, Gifu-ken (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 09/457,159

(22) Filed: Dec. 8, 1999

(30) Foreign Application Priority Data

Dec. 18, 1998 (JP) .......................................... 10-361130

(51) Int. Cl.[7] ................................................ H04N 9/67
(52) U.S. Cl. ...................................... 348/659; 348/649
(58) Field of Search ................................ 348/659, 660, 348/649, 651, 223, 256, 708, 675, 710, 638, 639

(56) References Cited

U.S. PATENT DOCUMENTS

| | | | | |
|---|---|---|---|---|
| 3,808,357 A | * | 4/1974 | Nakagaki et al. | 178/5.45 T |
| 4,245,239 A | * | 1/1981 | Richman | 358/37 |
| 4,926,247 A | * | 5/1990 | Nagasaki et al. | 358/43 |
| 5,130,786 A | * | 7/1992 | Murata et al. | 358/21 R |
| 5,150,206 A | * | 9/1992 | Roberts | 358/30 |
| 6,275,261 B1 | * | 8/2001 | Yamakazi | 348/273 |

* cited by examiner

Primary Examiner—Victor R. Kostak
(74) Attorney, Agent, or Firm—Sheridan Ross P.C.

(57) ABSTRACT

An image processing circuit generates first and second color difference data U/V from image data which includes first, second and third complementary color data. The complementary color data each represent a respective complementary color of the primary colors (R,G,B). The circuit includes a distribution circuit that distributes the image data into the first to third complementary color data. A multiplication circuit multiplies combinations of the complementary color data to generate first to third products. A subtraction circuit subtracts one product from another to generate first and second difference values. A square root circuit calculates the square root of the absolute value of the first and second difference values to generate first and second root values. First and second polarity codes, which indicate the polarity of the first and second difference values, are added to the first and second root values to generate first and second polarized roots. A color difference matrix circuit then synthesizes the first and second polarized roots to generate the first and second difference data U/V.

8 Claims, 5 Drawing Sheets

METHOD AND APPARATUS FOR PROCESSING IMAGE DATA

BACKGROUND OF THE INVENTION

The present invention relates to a method and an apparatus for processing image data, and more particularly, to an image data processing method which generates color difference data from complementary color data representing complementary color components.

FIG. 1 is a block diagram showing the configuration of a conventional image sensing device which uses a CCD image sensor 1, and FIG. 2 is a plan view showing an example of a conventional mosaic color filter attached to the CCD image sensor 1.

The CCD image sensor 1 has a plurality of light-receiving pixels, a plurality of vertical shift registers and usually a horizontal shift register. The light-receiving pixels are arranged in a matrix form on a light-receiving surface at regular intervals and produce and store information charges corresponding to the image of a sensed object. The vertical shift registers are arranged to correspond to the columns of the light-receiving pixels and sequentially shift the information charges stored in the light-receiving pixels in the vertical direction. The horizontal shift register is arranged on the output side of the vertical shift registers and receives the information charges output from the vertical shift registers, and then transfers the information charges row by row. This allows the horizontal shift register to output an image signal I0 in accordance with the information charges stored in the light-receiving pixels.

An analog processing circuit 2 performs a process, such as sampling and holding or level clamping, on the image signal I0 input from the CCD image sensor 1 to produce an image signal I1 which conforms to a predetermined format. For example, in the sample and hold process, only an image signal having a certain-signal level is extracted from the image signal I0 having reset levels and signal levels which are alternately repeated in synchronism with the output operation of the CCD image sensor 1. In the level clamping process, the black reference level set at the end of the horizontal scanning period of the image signal I0 is clamped to a predetermined level every horizontal scanning period. An A/D converter circuit 3 quantizes the image signal I1 received from the analog processing circuit 2 to generate image data D which represents the information with a digital value corresponding to each light-receiving pixel of the CCD image sensor 1.

A digital processing circuit 4 performs a process, such as color distribution or a matrix operation, on the image data D received from the A/D converter circuit 3 and generates luminance data Y and color difference data U and V. For example, in the color distribution process, the image data D is distributed in accordance with the color arrangement of a color filter attached to the light-receiving surface of the CCD image sensor 1, generating a plurality of color component data. Further, in the matrix operation process, primary color data corresponding to the three primary colors of light are generated from the individually distributed color component data, and are then combined at a predetermined ratio, thereby generating the color difference data U, V.

A driver 5 responds to various timing signals from a timing control circuit 6 and supplies a multi-phase drive clock to the shift registers of the CCD image sensor 1. For example, a 4-phase vertical transfer clock $\phi v$ is supplied to the vertical shift registers, and a 2-phase horizontal transfer clock $\phi h$ is supplied to the horizontal shift register. In accordance with a reference clock having a predetermined cycle, the timing control circuit 6 produces a vertical timing signal VT, which determines the vertical scan timing of the CCD image sensor 1, and a horizontal timing signal HT, which determines the horizontal scan timing, and supplies the timing signals to the driver 5. At the same time, the timing control circuit 6 supplies a timing clock CT to the analog processing circuit 2, the A/D converter circuit 3, and the digital processing circuit 4 in order to synchronize the operations of the circuits 2, 3, 4 with the output operation of the CCD image sensor 1.

When performing color image sensing, a color filter for color distribution is attached to the light-receiving surface in order to associate the individual light-receiving pixels of the CCD 1 with predetermined color components. A stripe type filter having a plurality of segments connected in the vertical direction or a mosaic type filter having a plurality of segments associated with the light-receiving pixels may be used as the color filter. For example, the mosaic type color filter, shown in FIG. 2, is split into a plurality of segments corresponding to each pixel of the light-receiving section of the CCD image sensor 1 and color components of Ye (yellow), Cy (cyan), W (white) and G (green) are cyclically assigned to each segment. The W and G components are alternately arranged in odd rows and the Ye and Cy components are alternately arranged in even rows. In an image signal obtained from the CCD image sensor 1, to which such color filter is attached, the W and G components are repeated when reading odd rows and the Ye and Cy components are repeated when reading even rows.

FIG. 3 is a block diagram showing the configuration of the digital signal processing circuit 4, and FIG. 4 is a timing diagram for describing the operation of the processing circuit 4. FIG. 4 corresponds to the case where the mosaic type color filter shown in FIG. 2 is attached to the CCD image sensor 1.

A color distribution circuit 11 separates the image data D in which each color component continues in the arrangement order of the segments of the color filter. The distribution circuit 11 then generates color component data C[Ye], C[Cy], C[G] and C[W]. For the image data D input from the A/D converter circuit 3, as shown in FIG. 4, the G and W components continue alternately when reading odd rows (ODD) and the Ye and Cy components continue alternately when reading even rows (EVEN). Accordingly, the color distribution circuit 11 retains at least one row of the image data D to allow the output of all the color component data C[Ye], C[Cy], C[G] and C[W] at the time of reading each row. Specifically, during reading of an odd row, the color distribution circuit 11 separates the image data D for the odd row and outputs the color component data C[G] and C[W]. At the same time, the color distribution circuit 11 separates the image data D for the previously read even row and outputs the color component data C[Ye] and C[Cy]. Further, this scheme causes the color component data C[Ye], C[Cy], C[G] and C[W] to be output intermittently when the image data D is output serially. The intermittent portions of the color component data are then interpolated by outputting the same color component data twice in succession.

A color calculation circuit 12 performs a color computation process according to, for example, the following equations on the color component data C[Ye], C[Cy], C[G] and C[W] input from the color distribution circuit 11, to generate primary color data P[R], P[G] and P[B] corresponding to the three primary colors (R: red, G: green and B: blue) of light.

Ye−G=R
Cy−G=B
G=G

A white balance control circuit 13 assigns specific gains to each of the primary color data P[R], P[G] and P[B] input from the color calculation circuit 12 to adjust the balance of each color. In other words, in the white balance control circuit 13, because this adjustment compensates for differences in the sensitivities of the light-receiving pixels of the CCD image sensor 1 which depend on each color component, the gains of the primary color data P[R], P[G] and P[B] are individually set to improve the color reproduction of a reproduced image.

A color difference matrix circuit 14 generates the color difference data U and V from the primary color data P[R], P[G] and P[B] input from the white balance control circuit 13. The color difference matrix circuit 14 combines the respective primary color data P[R], P[G] and P[B] at a ratio of 3:6:1 to generate luminance information. Then, the color difference matrix circuit 14 subtracts the luminance information from the primary color data P[B] corresponding to the B component to generate the color difference data U. Further, the color difference matrix circuit 14 subtracts the luminance information from the primary color data P[R] corresponding to the R component to generate the color difference data V.

A luminance calculation circuit 15 combines the four color components included in the image data D provided to the color distribution circuit 11 to generate the luminance data Y. That is, if each of the components Ye, Cy, G, W are combined, then $$Ye + Cy + G + W = (B+G) + (R+G) + G + (R+G+B)$$
$$= 2R + 4G + 2B$$

This allows luminance data in which the R, G and B components are combined at a ratio of 1:2:1 to be obtained. While the NTSC standards define a luminance signal produced by combining the R, G and B components at a ratio of 3:6:1, a luminance signal produced by combining the components at a ratio close to this ratio does not cause a practical problem.

An aperture circuit 16 enhances a specific frequency component included in the luminance data to generate aperture data, and adds the aperture data to the luminance data to generate a luminance data signal Y. In other words, to enhance the outline of the image of a sensed object, the aperture circuit 16 performs a filtering process on the image data D to generate aperture data such that the frequency component of one fourth the sampling frequency, which is used to obtain the image data D from the image signal, is enhanced. The luminance data signal Y generated in this manner is supplied to an external display device or recording device together with the color difference data U and V.

Because the R and B components are generated in the color computation process by the color calculation circuit 12 by subtracting the G component from the Ye and Cy components, respectively, the R or B component may show a negative value because of the unevenness of spectral characteristics of the color filter. For example, for light in which the G component is strong and the R or B component are weak, the Ye or Cy component has a slightly higher value than the G component, and the R or B component show a positive value close to "0". However, if the desired light cannot transmitted through the Ye or Cy and the Ye or Cy component can be obtained only by a lower value than the G component, the R or B component has a negative value as a result of the color computation process. Such negative values are not original color components, and thus produce false signals, thereby deteriorating the image quality of the reproduced image.

SUMMARY OF THE INVENTION

Accordingly, it is an object of the present invention to provide an image data processing apparatus that is substantially unaffected by the color computation process even if the spectral sensitivity of each color component in the color filter is not the same.

To achieve the above object, the present invention provides a method for generating a first color difference data and a second color difference data by processing a first complementary color data, a second complementary color data, and a third complementary color data, each representing a respective complementary color of one of the three primary colors. The method includes the steps of multiplying the first complementary color data and the second complementary color data to generate a first product, multiplying the first complementary color data and the third complementary color data to generate a second product, multiplying the second complementary color data and the third complementary color data to generate a third product, subtracting the second product from the first product to generate a first difference, subtracting the second product from the third product to generate a second difference, extracting the square root of an absolute value of the first difference to generate a first root, extracting the square root of an absolute value of the second difference to generate a second root, adding a polarity indication code of the first difference to the first root, adding a polarity indication code of the second difference to the second root, and synthesizing the first and second roots, to which the polarity indication codes have been added, to generate the first and second color difference data.

A further aspect of the present invention provides an apparatus for generating a first color difference data and a second color difference data by processing image data including a first complementary color data, a second complementary color data, and a third complementary color data, each representing a respective complementary color of one of the three primary colors. The apparatus includes a distribution circuit for distributing the image data into the first complementary color data, the second complementary color data, and the third complementary color data. A multiplication circuit multiplies the first complementary color data and the second complementary color data to generate a first product, the first complementary color data and the third complementary color data to generate a second product, and the second complementary color data and the third complementary color data to generate a third product. A subtraction circuit subtracts the second product from the first product to generate a first difference, and the second product from the third product to generate a second difference. A square root extraction circuit extracts a square root of an absolute value of the first difference to generate a first root, and a square root of an absolute value of the second difference to generate a second root. A polarity adding circuit adds a polarity indicating code of the first difference to the first root, and a polarity indicating code of the second difference to the second root to generate first and second polarized roots. A color difference matrix circuit synthesizes the first and second polarized roots to generate the first and second color difference data.

Another aspect of the present invention provides an apparatus for generating first and second color difference data by processing image data including a first complementary color data, a second complementary color data, and a third complementary color data, each of the first to third complementary color data representing a respective complementary color of the three primary colors of light. The apparatus includes a distribution circuit for distributing the image data into the first complementary color data, the second complementary color data, and the third complementary color data. A color balance control circuit is connected to the distribution circuit to apply a gain to each of the first to third complementary color data and generate first to third gain adjusted complementary color data. A multiplication circuit is connected to the color balance control circuit to multiply the first gain adjusted complementary color data and the second gain adjusted complementary color data to generate a first product, the first gain adjusted complementary color data and the third gain adjusted complementary color data to generate a second product, and the second gain adjusted complementary color data and the third gain adjusted complementary color data to generate a third product. A subtraction circuit subtracts the second product from the first product to generate a first difference, and the second product from the third product to generate a second difference. A square root extraction circuit extracts a square root of an absolute value of the first difference to generate a first root, and a square root of an absolute value of the second difference to generate a second root. A polarity adding circuit adds a polarity indicating code of the first difference to the first root, and a polarity indicating code of the second difference to the second root to generate first and second polarized roots. A color difference matrix circuit synthesizes the first and second polarized roots to generate the first and second color difference data.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

Figure 1:
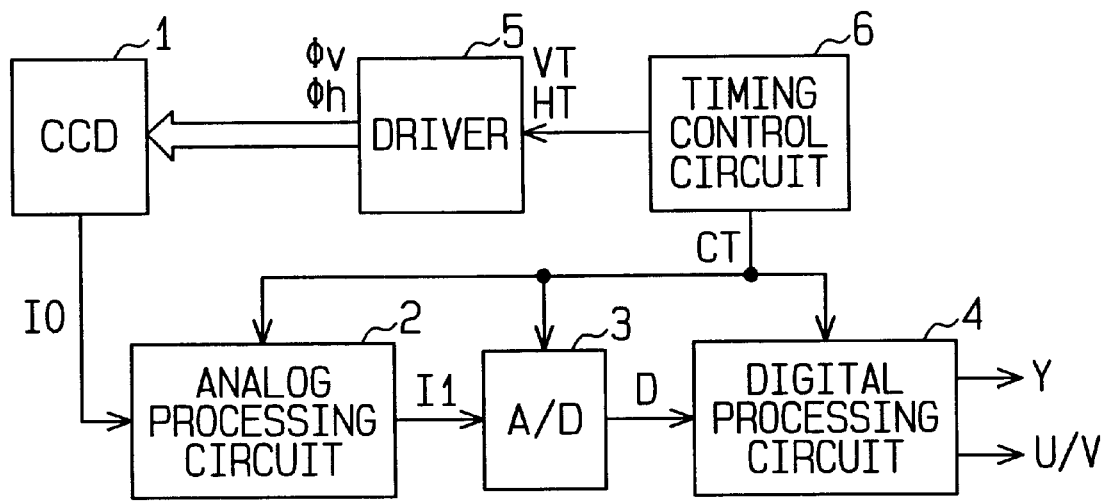
FIG. 1 is a schematic block diagram showing the configuration of a conventional solid-state image sensor.
Figure 2:
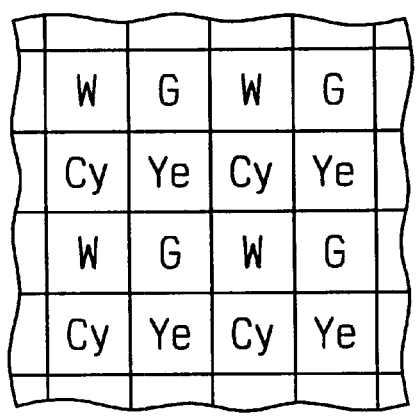
FIG. 2 is a diagram showing an example of a conventional mosaic type color filter.
Figure 3:
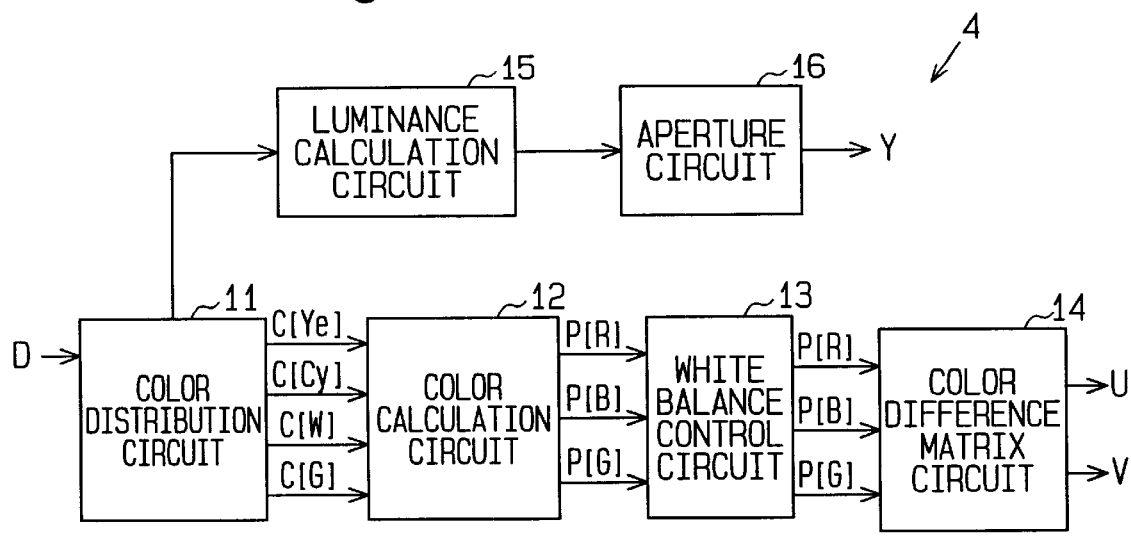
FIG. 3 is a schematic block diagram of a digital processing circuit of the image sensor of FIG. 1.
Figure 4:
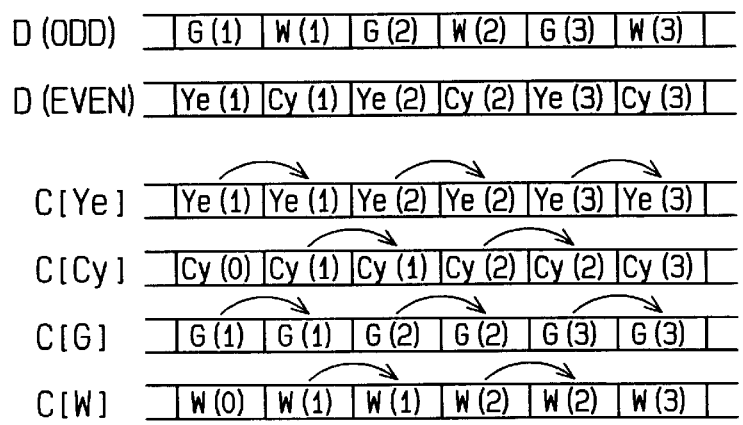
FIG. 4 is a timing chart for describing the operation of the conventional image data processing circuit of FIG. 3.
Figure 5:
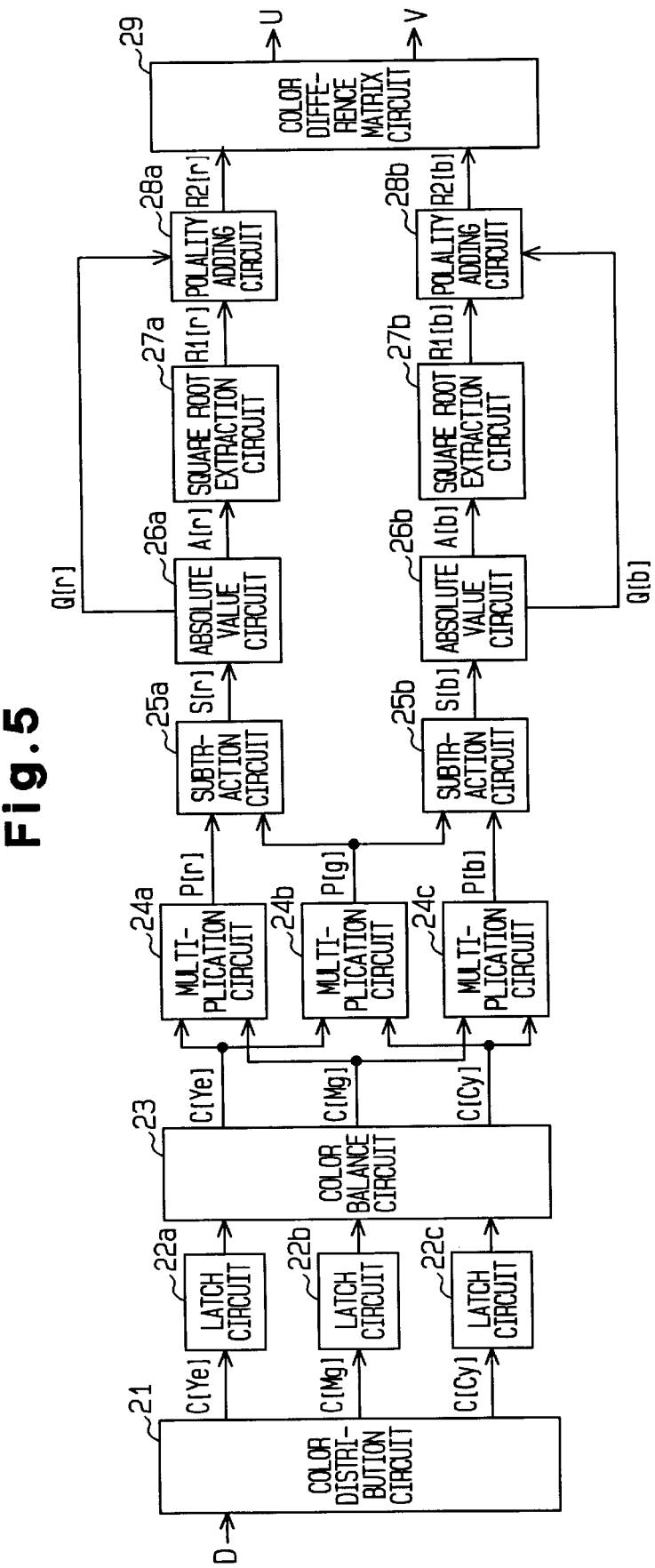
FIG. 5 is a block diagram of an image data processing apparatus according to a first embodiment of the present invention.
Figure 6:
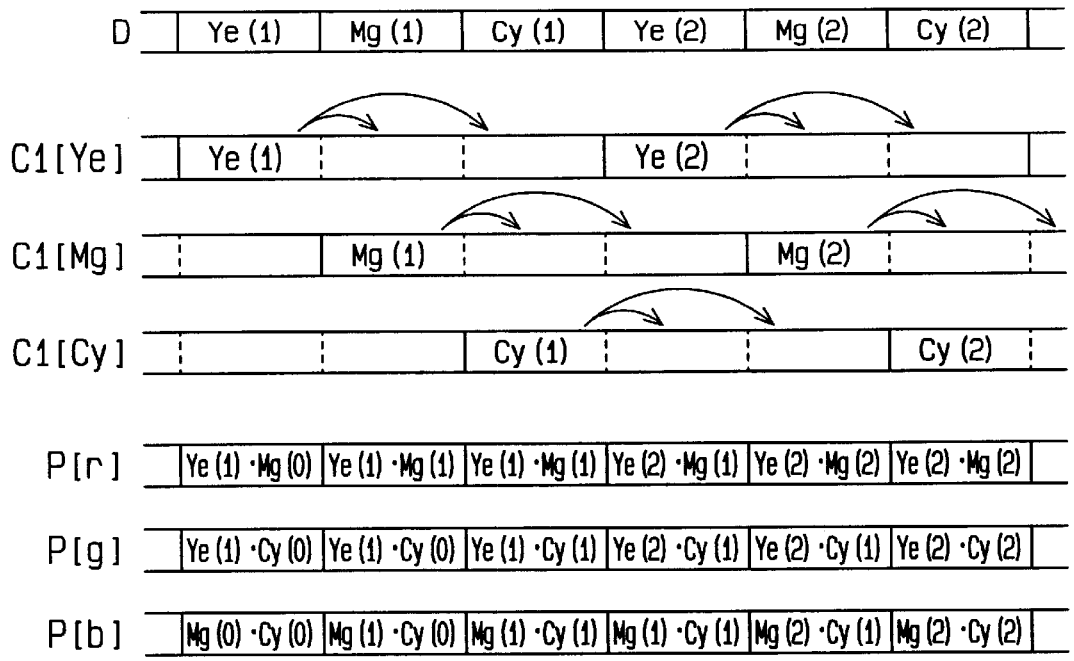
FIG. 6 is a timing chart for describing the operation of the image data processing apparatus of FIG. 5.

FIG. 5 is a block diagram showing the configuration of an image data processing apparatus according to the present invention, and FIG. 6 is a timing chart for describing the operation of the apparatus. It is assumed in this case that the image data D input to the apparatus, for example, is obtained from an image sensor to which a stripe type color filter is attached. The stripe type color filter comprises the complementary colors of light (Ye: yellow, Mg: magenta and Cy: cyan), and the image data D repeats the three complementary color components.

A color distribution circuit 21 separates the image data D, which is input per pixel, for each color component and generates complementary color data C[Ye], C[Mg], and C[Cy] corresponding to Ye, Mg, and Cy. In other words, for the image data D, because each complementary color component, for example, is repeated per pixel in the order of Ye, Mg and Cy, the complementary color data C[Ye], C[Mg], and C[Cy] representing the complementary color components are generated by distributing the image data D into three parts in a given order. First to third latch circuits 22a to 22c are connected in parallel to the color distribution circuit 21 and latch the complementary color data C[Ye], C[Mg] and C[Cy] provided by the color distribution circuit 21, respectively, and output the latched data until the next data is provided from the color distribution circuit 21. Since each of the complementary color data C[Ye], C[Mg] and C[Cy] is one third the image data D and the image data D is updated once every three pixels, three consecutive pixels are represented using the same data.

A color balance circuit 23 applies an inherent gain, which is set for each color, to each of the complementary data C[Ye], C[Mg], C[Cy] sent from the corresponding first to third latch circuits 22a–22c in order to adjust the balance of each color. Thus, a white object would be reproduced on a display device with the same white color. The gain of each color is determined by integrating the complementary color data C[Ye], C[Mg], C[Cy] by a predetermined period and equalizing the integral values.

A first multiplication circuit 24a multiplies the balance adjusted complementary data C[Ye] and C[Mg] from the color balance circuit 23 to generate a first product P[r]. A second multiplication circuit 24b multiplies the balance adjusted complementary data C[Ye] and C[Cy] to generate a second product P[g]. A third multiplication circuit 24c multiplies the balance adjusted complementary data C[Mg] and C[Cy] to generate a third product P[b].

A first subtraction circuit 25a is connected to the first and second multiplication circuits 24a, 24b and subtracts the second product P[g], which is sent from the second multiplication circuit 24b, from the first product P[r], which is sent from the first multiplication circuit 24a, to generate a first difference S[r]. A second subtraction circuit 25b is connected to the second and third multiplication circuits 24b, 24c and subtracts the second product P[g], which is sent from the second multiplication circuit 24b, from the third product P[b], which is sent from the third multiplication circuit 24c to generate a second difference S[b].

A first absolute value circuit 26a is connected to the first subtraction circuit 25a to generate a first absolute value A[r] of the first difference S[r]. The first absolute value circuit 26a also extracts a first code Q[r], which indicates whether the value of the first difference S[r] is positive or negative, and sends the code Q[r] to a polarity adding circuit 28a (described later). A second absolute value circuit 26b is connected to the second subtraction circuit 25b to generate a second absolute value A[b] of the second difference S[b]. The second absolute value circuit 26b also extracts a second code Q[b], which indicates whether the value of the second difference S[b] is positive or negative, and sends the code Q[b] to a polarity adding circuit 28b (described later). A first square root extraction circuit 27a is connected to the first absolute value circuit 26a to calculate the square root of the first absolute value A[r] and generate a first root R1[r]. A second square root extraction circuit 27b is connected to the second absolute value circuit 26b to calculate the square root of the second absolute value A[b] and generate a second root R1[b]. The first polarity adding circuit 28a adds the first code Q[r], sent from the first absolute value circuit 26a, to the first root R1[r] to generate a polarized first root R2[r]. The second polarity adding circuit 28b adds the second code Q[b], sent from the second absolute value circuit 26b, to the second root R1[b] to generate a polarized second root R2[b].

A color difference matrix circuit 29 is connected to the first and second polarity adding circuits 28a, 28b to synthesize the polarized first and second roots R2[r], R2[b] and generate color difference data U, V. The color difference matrix circuit 29 is formed so that, for example, the second polarized root R2[b] is multiplied by a first predetermined multiplier and the product is added to the first polarized root R2[r] to generate the color difference data V, and the first polarized root R2[r] is multiplied by a second predetermined multiplier and the product is added to the second polarized root R2[g] to generate the color difference data U.

A method for processing image data according to the present invention now will be described.

Figure 7:
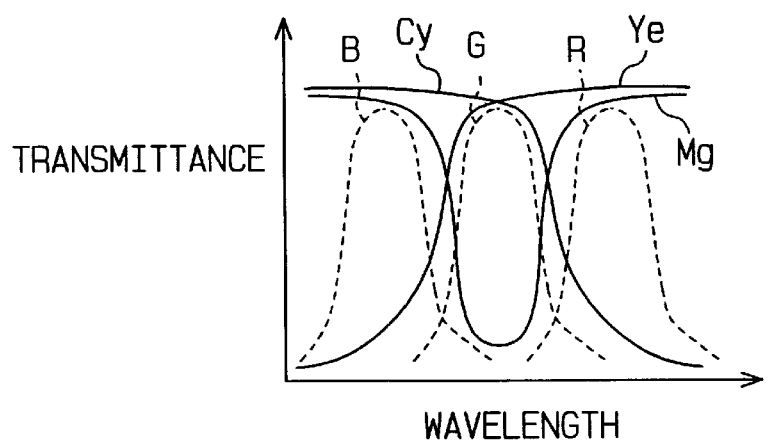
FIG. 7 is a graph illustrating the spectral characteristic of a color filter.

FIG. 7 is a diagram showing spectral characteristics of a color filter associated with the three primary colors of light and their complementary colors.

In general, color filters corresponding to the three primary colors of light have spectral characteristics shown by the dashed lines of FIG. 7. The transmittance of the R filter is maximal at the portion corresponding to the red light, which wavelength is long, and low at the portion where the wavelength is shorter than the red light. Conversely, the transmittance of the B filter is maximal at the portion corresponding to the blue light, wavelength is short, and low at the portion where the wavelength is longer than blue. The characteristic of the G filter comes between the R filter and the B filter.

In contrast, filters corresponding to the complementary colors (Ye, Mg and Cy) of R, G and B have spectral characteristics shown by the solid lines of FIG. 7. That is, the Cy filter, which is the complementary color of R, has a characteristic contrary to that of the R filter. The transmittance of the Cy filter increases where the wavelength is short and the portion corresponding to the red light is not included. The Ye filter, which is the complementary color of B, has a characteristic contrary to that of the B filter. The transmittance of the Ye filter increases where the wavelength is long and the portion corresponding to the blue right is not included. The transmittance of the Mg filter, which is the complementary color of G, increases where the portion corresponding to the green light is not included.

Multiplication of the Cy component, which is produced in accordance with the light transmitted through the Cy filter, and the Mg component, which is produced in accordance with the light transmitted through the Mg filter, enhances the B component included in both Cy and Mg components and attenuates the G component and R component included in only one of the Cy and Mg components. In the same manner, multiplication of the Mg component, which is produced in accordance with the light transmitted through the Mg filter, and the Ye component, which is produced in accordance with the light transmitted through the Ye filter, enhances the R component included in both Mg and Ye components and attenuates the B component and G component included in only one of the Mg and Ye components. Multiplication of the Cy component, which is produced in accordance with the light transmitted through the Cy filter, and the Ye component, which is produced in accordance with the light transmitted through the Ye filter, enhances the G component included in both Cy and Ye components and attenuates the R component and B component included in only one of the Cy and Ye components. The products of each of the complementary color components are associated with specific primary color components.

Accordingly, P[r], P[g], P[b], which are obtained by the respective first to third multiplication circuits 24a–24c, are each associated with the square of each primary color component (R2, G2, B2). Furthermore, the first and second differences S[r], S[b], which are obtained by the respective first and second subtraction circuits 25a, 25b, are associated with the difference between the squares of the primary color components (R2-G2, B2-G2). The differences between the main color components (R-G, B-G) are approximated by the square roots of the first and second differences S[r], S[b]. The negative/positive codes Q[r], Q[b] of the first and second differences S[r], S[b] are respectively added to the differences between the main color components (R-G, B-G). In other words, the square roots of the first and second absolute values A[r], A[b] of the respective first and second differences S[r], S[b] are computed. The negative/positive codes Q[r], Q[b] of the first and second differences S[r], S[b] are added to the computed first and second roots R1[r], R1[b], respectively. This prevents an imaginary number from being obtained during computation of the square root. The first and second roots R2[r], R2[b] calculated by the computation-process described above are associated with the difference between the primary color components (R-G, B-C).

The accuracy of the above computation process with respect to the image data obtained in association with specific colors will now be shown.

EXAMPLE 1

Irradiation of an R Component of Light

In a single color light formed only by the R component, if the information amount of the R component is represented by k, the G component and the B component are both zero. Thus, the information amount of each of the complementary colors are represented as listed below.

C[Ye]=k+0=k
C[Mg]=k+0=k
C[Cy]=k0+0=0
The products of these values are as shown below.
P[r]=k·k=$k^2$
P[g]=k·0=0
P[b]=k·0=0
The differences between the products are as shown below.
S[r]=$k^2$0=$k^2$
S[b]=0−0=0

The square roots of the absolute values of the differences are as shown below.

R1[r]=k

R1[b]=0

Since the codes of the above differences are positive and zero, the square roots are used directly.

R2[r]=k

R2[b]=0

These values coincide with the values obtained directly from the primary color components. Similar computation results are obtained from the G and B components.

EXAMPLE 2

Irradiation of a Ye Component of Light

In a light including the Ye component, if the information amount of the R and G components are represented by k, the B component is zero. Thus, the information amount of each of the complementary colors are represented as listed below.

C[Ye]=k+k=2k

C[Mg]=k+0=k

C[Cy]=0+k=k

The products of these values are as shown below.

$P[r]=2k \cdot k=2k^2$ $P[g]=2k \cdot k=2k^2$ $P[b]=k \cdot k=k^2$

The differences between the products are as shown below.

$S[r]=2k^2-2k^2=0$ $S[b]=k^2-2k^2=-k^2$

The square roots of the absolute values of the differences are as shown below.

R1[r]=0

R1[b]=k

Since the codes of the above differences are negative and zero, the codes are added to the square roots accordingly.

R2[r]=0

R2[b]=−k

These values coincide with the values obtained directly from the primary color components. Similar computation results are obtained from the Mg and Cy components.

EXAMPLE 3

Irradiation of a White Color Light

In a white color light, the R, G, and B components are equal to each other. Thus, if the information amount of the R, G and B components are represented by k, the information amount of each of the complementary colors are represented as listed below.

C[Ye]=k+k=2k

C[Mg]=k+k=2k

C[Cy]=k+k=2k

The products of these values are as shown below.

$P[r]=2k \cdot 2k=4k^2$ $P[g]=2k \cdot 2k=4k^2$ $P[b]=2k \cdot 2k=4k^2$

The differences between the products are as shown below.

$S[r]=2k^2-2k^2=0$ $S[b]=2k^2-2k^2=0$

The square roots of the absolute values of the differences are as shown below.

R1[r]=0

R1[b]=0

Since the codes of the above differences are zero, the square roots are used directly.

R2[r]=0

R2[b]=0

These values coincide with the values obtained directly from the primary color components.

A subtraction process is not performed when calculating the primary color information from the complementary color information. Therefore, negative values are not produced during the color computation process even if the spectral sensitivity of each color filter is not the same. A certain amount of error may occur during the computation process with regard to lights of colors other than the three primary colors, the complementary colors, and the white color. However, such colors are not visually noticeable on a reproduction display device and thus do not cause problems.

Figure 8:
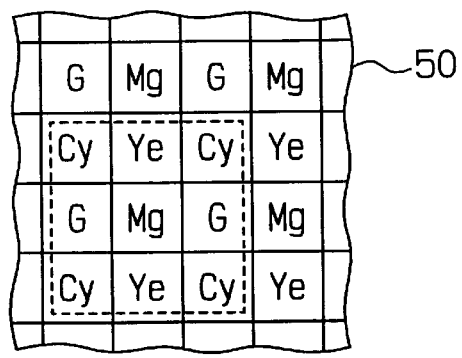
FIG. 8 is a diagram showing an example of a mosaic type color filter in accordance with the present invention.
Figure 9:
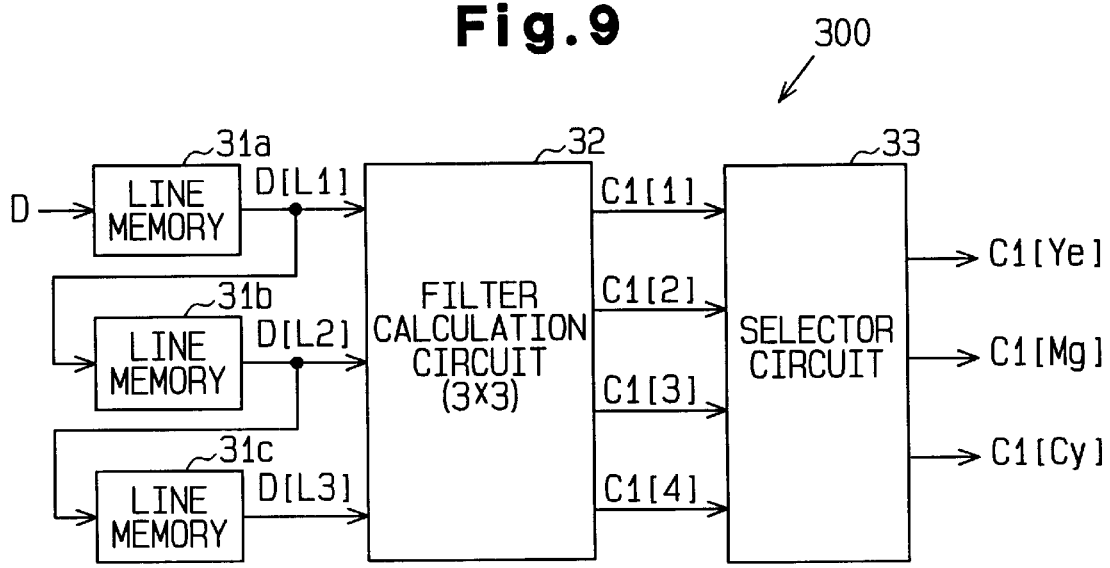
FIG. 9 is a block diagram of a color distribution section of the present invention associated with the mosaic filter of FIG. 8.

FIG. 8 is a plan view showing the configuration of a mosaic type color filter 50 optimal for the application of the processing method of the present invention. FIG. 9 is a schematic block diagram showing the configuration of a distribution section 300 which separates the image signal D, obtained from an image sensor to which the color filter 50 is attached, into the complementary color components. The distribution section 300 replaces the color distribution circuit 21 and the first to third latch circuits 22a to 22c in the processing apparatus shown in FIG. 5.

The color filter 50 has segments corresponding to each of the components of Ye, Mg, Cy and G. The Mg and G components are alternately arranged in odd rows, and the Ye and Cy components are arranged alternately in even rows. Then, each component of Ye, Mg and Cy is used for producing luminance information in addition to the color information, and the G component is used only for producing the luminance information. In an image sensor to which the color filter 50 is attached, the Mg and G components continue alternately in an image signal generated from the odd rows and the Ye and Cy components continue alternately in the image signal generated from the even rows.

The distribution section 300 includes first to third line memories 31a to 31c, a filter calculation circuit 32, and a selector circuit 33. The first to third line memories 31a–31c are connected in series and store three rows of image data D. Further, the first to third line memories 31a–31c read the image data D[L1], D[L2] and D[L3] of each row simultaneously and send the image data D[L1], D[L2] and D[L3] to the filter calculation circuit 32.

The filter calculation circuit 32 receives three columns of the image data D[L1], D[L2] and D[L3] from the first to third line memories 31a–31c and generates the color component data C[1], C[2], C[3] and C[4] corresponding to each segment of the color filter. For example, in FIG. 8, the center pixel is specified as a target pixel for the nine pixels enclosed within the broken lines and the Mg component of the target pixel is output as the color component data C[1]. Further, the mean value of the two G component pixels located on the right and left of the target pixel is output as the color component data C[2], and the mean value of the two Ye component pixels located above and below the target pixel is output as the color component data C[3]. Further the mean value of the four Cy component pixels located at the four corners is output as the color component data C[4]. The interrelationship between the color component data C[1], C[2], C[3] and C[4] and the color components Ye, Mg, Cy and G are switched every time the target pixel is shifted.

The selector circuit 33 selects the color component data C[1], C[2], C[3] and C[4] representing each component Ye, Mg and Cy and outputs the selected data as the complementary color data C[Ye], C[Mg] and C[Cy]. The selection operation is switched between four patterns in accordance with the color component of the target pixel. Accordingly, in the same manner as the first to third latch circuits 22a to 22c shown in FIG. 5, the selector circuit 33 provides three types of the complementary color data C[Ye], C[Mg], C[Cy], which always exist, to the first to third multiplication circuits 23a to 23c of FIG. 5. By using the distribution section 300, the mosaic type color filter 50 can be used in the processing apparatus of the present invention.

It should be apparent to those skilled in the art that the present invention may be embodied in many other specific forms without departing from the spirit or scope of the invention. Particularly, it should be understood that the invention may be embodied in the following forms.

In the above embodiments, although a CCD image sensor is illustrated, a MOS sensor can be used as the image sensor. Further, a color filter needs only at least the three types of complementary colors (Ye, Mg and Cy) for application of the present invention and the complementary colors may be combined with other color components.

The present examples and embodiment are to be considered as illustrative and not restrictive and the invention is not to be limited to the details given herein, but may be modified within the scope and equivalence of the appended claims.

What is claimed is:

1. A method for generating a first color difference data and a second color difference data by processing a first complementary color data, a second complementary color data, and a third complementary color data, each representing a respective complementary color of one of the three primary colors, the method comprising the steps of:

multiplying the first complementary color data and the second complementary color data to generate a first product;

multiplying the first complementary color data and the third complementary color data to generate a second product;

multiplying the second complementary color data and the third complementary color data to generate a third product;

subtracting the second product from the first product to generate a first difference;

subtracting the second product from the third product to generate a second difference;

extracting the square root of an absolute value of the first difference to generate a first root;

extracting the square root of an absolute value of the second difference to generate a second root;

adding a polarity indication code of the first difference to the first root;

adding a polarity indication code of the second difference to the second root; and synthesizing the first and second roots, to which the polarity indication codes have been added, to generate the first and second color difference data.

2. The method according to claim 1, wherein the first, second, and third complementary color data represent yellow, magenta, and cyan, respectively.

3. An apparatus for generating a first color difference data and a second color difference data by processing image data including a first complementary color data, a second complementary color data, and a third complementary color data, each representing a respective complementary color of one of the three primary colors, the apparatus comprising:

a distribution circuit for distributing the image data into the first complementary color data, the second complementary color data, and the third complementary color data;

a multiplication circuit for multiplying the first complementary color data and the second complementary color data to generate a first product, the first complementary color data and the third complementary color data to generate a second product, and the second complementary color data and the third complementary color data to generate a third product;

a subtraction circuit for subtracting the second product from the first product to generate a first difference, and the second product from the third product to generate a second difference;

an extraction circuit for extracting a square root of an absolute value of the first difference to generate a first root, and a square root of an absolute value of the second difference to generate a second root;

a polarity adding circuit for adding a polarity indicating code of the first difference to the first root, and a polarity indicating code of the second difference to the second root to generate first and second polarized roots; and a color difference matrix circuit for synthesizing the first and second polarized roots to generate the first and second color difference data.

4. The apparatus according to claim 3, wherein the distribution circuit includes a filter circuit which retains the first, second, and third complementary color data for a predetermined time and complements the first, second, and third complementary color data when one of the first, second, and third complementary color data is lacking.

5. The apparatus according to claim 3, further comprising:

a color balance control circuit, connected between the distribution circuit and the multiplication circuit, for applying a gain to each of the first to third complementary color data, wherein the multiplication circuit multiplies the resulting gain adjusted first to third complementary color data to generate the first to third products.

6. The apparatus according to claim 3, wherein the color difference matrix circuit generates the first color difference data by multiplying the second polarized root by a first multiplier and adding the resulting product to the first polarized root and generates the second color difference data by multiplying the first polarized root by a second multiplier and adding the resulting product to the second polarized root.

7. An apparatus for generating first and second color difference data by processing image data including a first complementary color data, a second complementary color data, and a third complementary color data, each of the first to third complementary color data representing a respective complementary color of the three primary colors of light, the apparatus comprising:

a distribution circuit for distributing the image data into the first Complementary color data, the second complementary color data, and the third complementary color data;

a color balance control circuit, connected to the distribution circuit, for applying a gain to each of the first to third complementary color data to generate first to third gain adjusted complementary color data;

a multiplication circuit, connected to the color balance control circuit, for multiplying the first gain adjusted complementary color data and the second gain adjusted complementary color data to generate a first product, the first gain adjusted complementary color data and the third gain adjusted complementary color data to generate a second product, and the second gain adjusted complementary color data and the third gain adjusted complementary color data to generate a third product;

a subtraction circuit for subtracting the second product from the first product to generate a first difference, and the second product from the third product to generate a second difference;

an extraction circuit for extracting a square root of an absolute value of the first difference to generate a first root, and a square root of an absolute value of the second difference to generate a second root;

a polarity adding circuit for adding a polarity indicating code of the first difference to the first root, and a polarity indicating code of the second difference to the second root to generate first and second polarized roots; and a color difference matrix circuit for synthesizing the first and second polarized roots to generate the first and second color difference data.

8. The apparatus according to claim 7, wherein the color difference matrix circuit generates the first color difference data by multiplying the second polarized root by a first multiplier and adding the resulting product to the first polarized root and generates the second color difference data by multiplying the first polarized root by a second multiplier and adding the resulting product to the second polarized root.

* * * * *